US012629989B2

(12) United States Patent
Snider et al.

(10) Patent No.: US 12,629,989 B2
(45) Date of Patent: May 19, 2026

(54) METHOD FOR MANUFACTURING A VEHICULAR REAR SLIDER WINDOW ASSEMBLY WITH RETAINING ELEMENT

(71) Applicant: Magna Mirrors of America, Inc., Holland, MI (US)

(72) Inventors: Darin J. Snider, Holland, MI (US); Benjamin J. Wolters, Hudsonville, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 18/802,179

(22) Filed: Aug. 13, 2024

(65) Prior Publication Data

US 2024/0399840 A1 Dec. 5, 2024

Related U.S. Application Data

(62) Division of application No. 17/647,755, filed on Jan. 12, 2022, now Pat. No. 12,065,023.

(60) Provisional application No. 63/199,615, filed on Jan. 13, 2021.

(51) Int. Cl.
*B60J 1/18* (2006.01)
*B60J 1/00* (2006.01)
*H01R 35/02* (2006.01)
*H05B 3/84* (2006.01)

(52) U.S. Cl.
CPC ............. *B60J 1/1853* (2013.01); *B60J 1/002* (2013.01); *B60J 1/007* (2013.01); *H01R 35/02* (2013.01); *H05B 3/84* (2013.01)

(58) Field of Classification Search
CPC .......... B60J 1/1853; B60J 1/002; B60J 1/007
See application file for complete search history.

(56) References Cited

U.S. PATENT DOCUMENTS

| | | | |
|---|---|---|---|
| 4,785,583 A | 11/1988 | Kawagoe et al. |
| 4,920,698 A | 5/1990 | Friese et al. |
| 4,995,195 A | 2/1991 | Olberding et al. |
| 5,146,712 A | 9/1992 | Hlavaty |
| 5,228,740 A | 7/1993 | Saltzman |
| 5,294,168 A | 3/1994 | Kronbetter |
| 5,345,717 A | 9/1994 | Mori et al. |
| 5,473,840 A | 12/1995 | Gillen et al. |
| 5,531,046 A | 7/1996 | Kollar et al. |
| 5,572,376 A | 11/1996 | Pace |

(Continued)

*Primary Examiner* — Muhammad Ijaz
*Assistant Examiner* — Susan M. Heschel
(74) *Attorney, Agent, or Firm* — HONIGMAN LLP

(57) ABSTRACT

A method for manufacturing a vehicular rear slider window assembly includes attaching an upper rail and a lower rail at an inner side of a fixed window panel. The lower rail includes a first attaching surface that attaches at the fixed window panel and a second attaching surface opposite the first attaching surface. The method includes disposing a movable window panel in a channel of the lower rail and a channel of the upper rail and attaching a retaining element along the lower rail and at the second attaching surface of the lower rail. The retaining element includes an attaching portion that attaches at the second attaching surface and a retaining portion that extends at least partially across the channel of the lower rail to limit vertical movement of the movable window panel relative to the upper and lower rails.

19 Claims, 15 Drawing Sheets

(56)                References Cited

U.S. PATENT DOCUMENTS

| | | | |
|---|---|---|---|
| 5,799,444 A | 9/1998 | Freimark et al. | |
| 5,996,284 A | 12/1999 | Freimark et al. | |
| 6,026,611 A | 2/2000 | Ralston et al. | |
| 6,119,401 A | 9/2000 | Lin et al. | |
| 6,691,464 B2 | 2/2004 | Nestell et al. | |
| 6,955,009 B2 | 10/2005 | Rasmussen | |
| 7,003,916 B2 | 2/2006 | Nestell et al. | |
| 7,051,478 B2 * | 5/2006 | Bourque | B60J 1/1853 49/408 |
| 7,073,293 B2 | 7/2006 | Galer | |
| 8,151,519 B2 | 4/2012 | Bello et al. | |
| 8,316,583 B2 | 11/2012 | Lahnala | |
| 8,322,075 B2 * | 12/2012 | Lahnala | E05D 15/0686 49/408 |
| 8,388,043 B2 | 3/2013 | Lahnala | |
| 8,402,695 B2 | 3/2013 | Smith et al. | |
| 8,595,981 B2 * | 12/2013 | Lahnala | B60J 1/1853 49/413 |
| 8,881,458 B2 * | 11/2014 | Snider | E05C 1/08 49/213 |
| 8,915,018 B2 | 12/2014 | Snider | |
| 8,938,914 B2 * | 1/2015 | Hulst | B60J 1/1853 49/128 |
| 9,579,955 B2 | 2/2017 | Snider | |
| 9,896,026 B2 | 2/2018 | Snider | |
| 10,501,008 B2 | 12/2019 | Snider | |
| 10,501,977 B2 | 12/2019 | Snider | |
| 10,524,313 B2 | 12/2019 | Snider et al. | |
| 10,668,868 B2 | 6/2020 | Snider et al. | |
| 11,247,546 B2 * | 2/2022 | Tooker | B29C 48/16 |
| 12,065,023 B2 | 8/2024 | Snider et al. | |
| 2003/0213179 A1 | 11/2003 | Galer | |
| 2004/0020131 A1 | 2/2004 | Galer et al. | |
| 2005/0073172 A1 | 4/2005 | Weinert et al. | |
| 2006/0107600 A1 | 5/2006 | Nestell et al. | |
| 2007/0157522 A1 | 7/2007 | Hebert et al. | |
| 2008/0127563 A1 | 6/2008 | Tooker | |
| 2010/0122494 A1 | 5/2010 | Lahnala | |
| 2010/0122497 A1 | 5/2010 | Lahnala | |
| 2012/0117880 A1 * | 5/2012 | Lahnala | B60J 1/1853 49/70 |
| 2013/0047513 A1 | 2/2013 | Lahnala | |
| 2014/0047772 A1 | 2/2014 | Hulst | |
| 2015/0298528 A1 | 10/2015 | Lahnala | |
| 2015/0314672 A1 | 11/2015 | Lahnala | |
| 2019/0383084 A1 | 12/2019 | Snider et al. | |
| 2020/0079198 A1 | 3/2020 | Tooker et al. | |
| 2022/0089008 A1 | 3/2022 | Tooker et al. | |
| 2022/0219511 A1 | 7/2022 | Snider et al. | |

* cited by examiner

METHOD FOR MANUFACTURING A VEHICULAR REAR SLIDER WINDOW ASSEMBLY WITH RETAINING ELEMENT

CROSS REFERENCE TO RELATED APPLICATIONS

The present application is a division of U.S. patent application Ser. No. 17/647,755, filed Jan. 12, 2022, now U.S. Pat. No. 12,065,023, which claims the filing benefits of U.S. provisional application Ser. No. 63/199,615, filed Jan. 13, 2021, which is hereby incorporated herein by reference in its entirety.

FIELD OF THE INVENTION

The present invention relates to a rear slider window assembly for a vehicle and, more particularly, a rear slider window assembly for a pickup truck or the like.

BACKGROUND OF THE INVENTION

It is known to provide a rear slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. The slidable window panel may be driven or moved by a cable drive system, such as described in U.S. Pat. No. 8,151,519, which is hereby incorporated herein by reference in its entirety.

SUMMARY OF THE INVENTION

A rear slider window assembly includes a fixed window panel and a movable window panel that moves relative to the fixed window panel and along upper and lower rails at the fixed window panel. The movable window panel moves between an opened position and a closed position (where the movable window panel is positioned over an aperture of the fixed window panel). The rear slider window assembly includes a guide/retaining element that retains and guides the movable window panel in the upper and/or lower channels of the upper and/or lower rails. The element is attached at the upper rail or the lower rail after the movable window panel is positioned with its upper edge region in the upper rail and its lower edge region in the lower rail. The element extends at least partially along the upper/lower rail (such as along a portion of the rail along which the movable panel moves when moving between the opened and closed positions) and limits or precludes removal of the movable window panel from the rails.

These and other objects, advantages, purposes and features of the present invention will become apparent upon review of the following specification in conjunction with the drawings.

DESCRIPTION OF THE PREFERRED EMBODIMENTS

Figure 1:
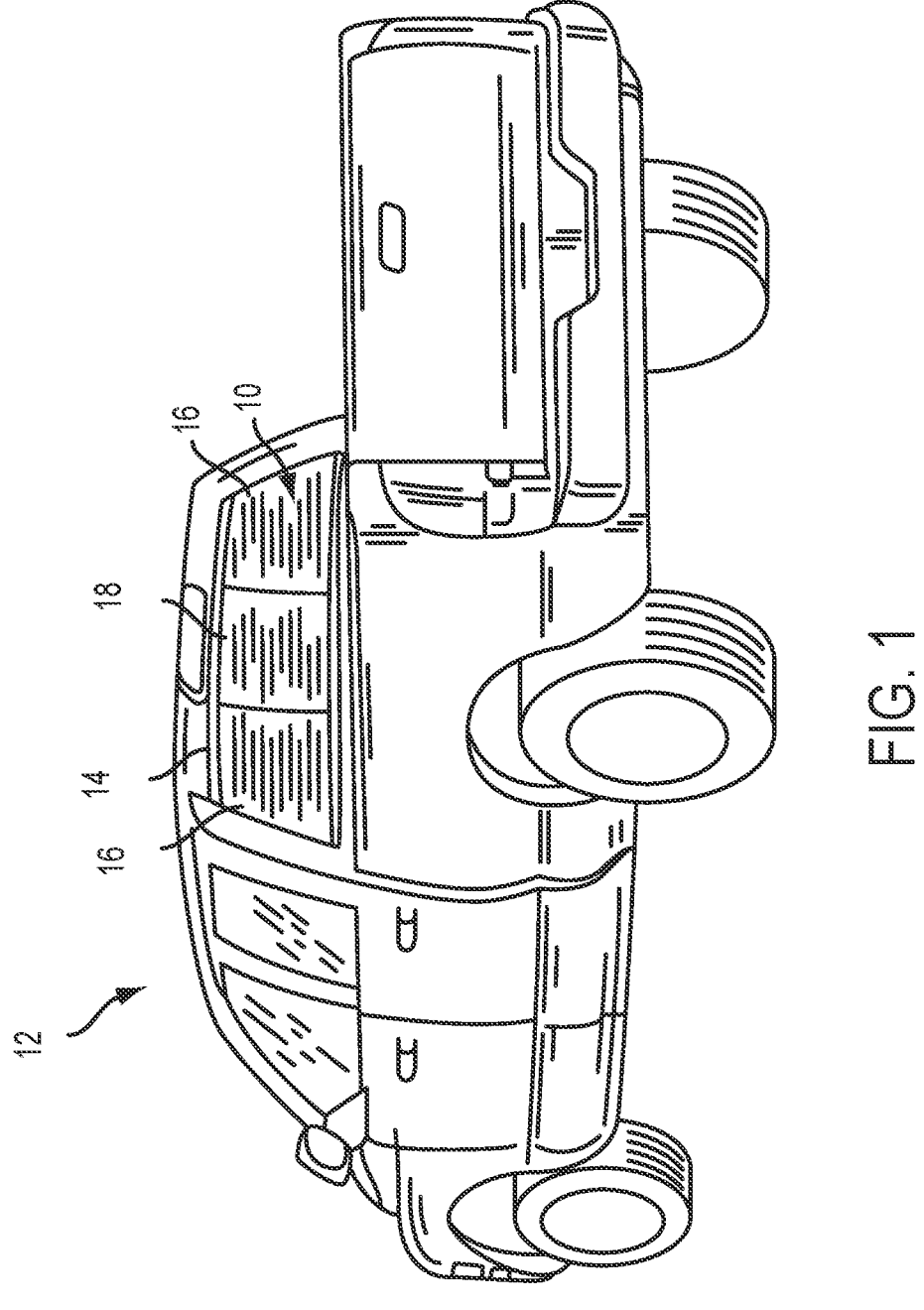
FIG. 1 is a rear perspective view of a pickup truck having a rear slider window assembly.

Referring now to the drawings and the illustrative embodiments depicted therein, a rear slider window assembly 10 of a vehicle 12 (such as a pickup truck or the like) includes a window frame 14, a fixed window panel 16 having an aperture that separates side window portions and a movable window panel 18 that is movable relative to frame 14 and fixed window panel between an opened position and a closed position. The frame 14 includes a lower frame portion or rail 20 and an upper frame portion or rail 22, each providing a respective channel along which the movable window panel moves. The window assembly 10 may include a heater grid established at the fixed window panel and at the movable window panel, with electrical current provided to the heater grid of the movable window panel via a flexible electrical connector or cable. As shown in FIGS. 2-10, the window assembly 10 includes a lower guide element or retaining element 24 that is attached at the lower frame 20 to limit chucking of the movable window panel as it is moved between its opened and closed positions, as discussed below.

Figure 18:
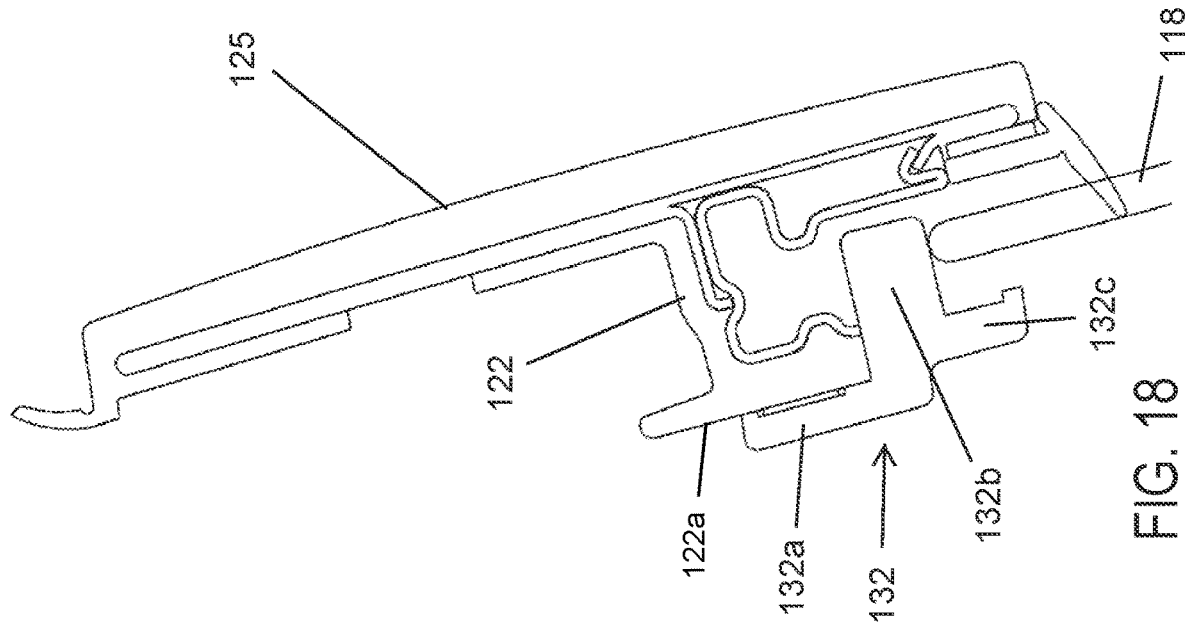
FIG. 18 is a sectional view of an upper portion of the rear slider window assembly, showing the upper guide element attached at the upper rail.
Figure 21:
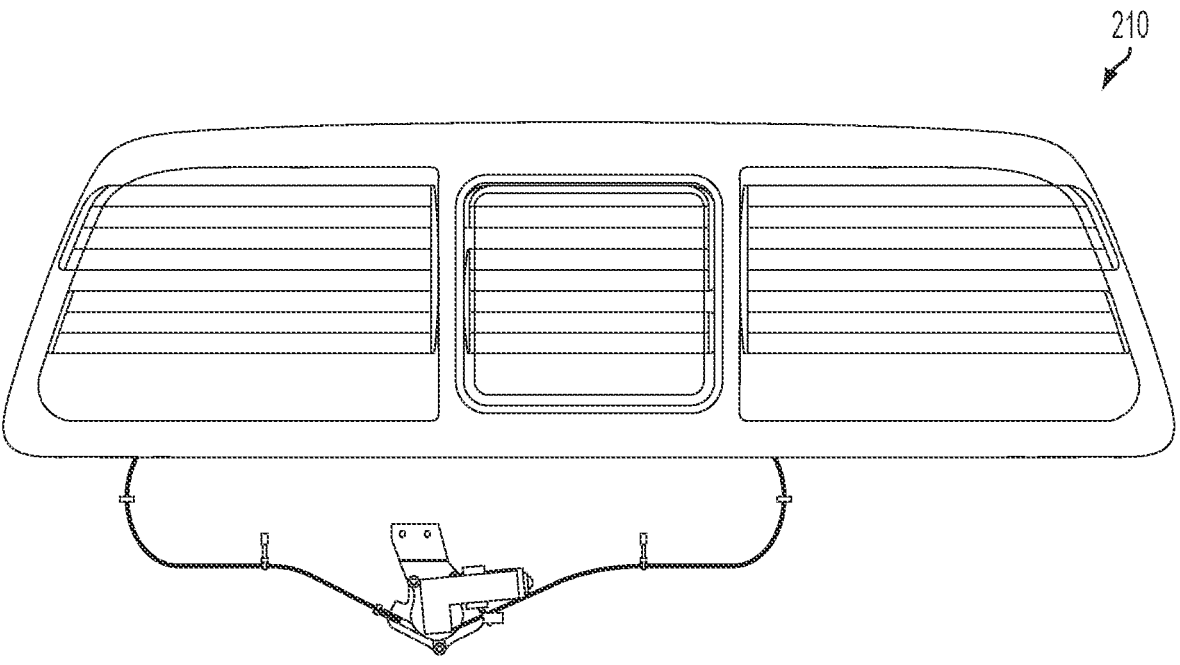
FIG. 21 is a perspective view of a rear slider window assembly with a single fixed glass window panel having an opening established therethrough.

The window assembly may comprise a hole-in-glass window configuration (such as window assembly 210 in FIG. 21), where a single fixed glass panel has an aperture or hole or opening established therethrough to define separate spaced apart fixed window panels or panel portions, such as in a similar manner as the window assemblies described in U.S. Pat. No. 8,881,458, which is hereby incorporated herein by reference in its entirety. Optionally, the window assembly may include two fixed window panels that are spaced apart so as to define an opening therebetween, with upper and lower appliqués or trim or filler panels or elements (see trim panels 25 and 125 in FIGS. 7 and 18, respectively) disposed at the upper and lower regions of the opening and between the fixed window panels. In such a configuration, the upper and lower rails attach along an inner surface of each of the two spaced apart fixed window panels and along an inner surface of the respective upper/lower trim panel.

The frame 14 comprises the upper rail 22 and the lower rail 20, with the upper and lower edge regions of movable window panel 18 movably or slidably received in and along the respective upper and lower rails. Thus, the movable window panel 18 includes a lower perimeter edge region or portion 18a that, with the movable window panel 18 disposed at the window assembly 10, is disposed or received in the lower rail 20, and an upper perimeter edge region or portion 18b that, with the movable panel 18 disposed at the window assembly 10, is disposed or received in the upper rail 22.

The slider or movable window panel 18 is movable along the lower rail and upper rail of the frame portion 14 to open and close the aperture or opening, such as in a manner similar to known slider window assemblies. The slider window panel 18 may be disposed at a lower carrier 19 (see FIGS. 7 and 8), which may receive the lower perimeter edge region 18a of the slider window panel 18 therein and may be slidably or movably received in the channel portion of the lower rail 20 of the frame portion 14. The upper rail 22 may comprise any suitable channel or rail element configured to slidably receive the upper perimeter edge region 18b of the movable window panel 18, and the upper rail 22 may comprise a unitarily formed upper rail or channel.

Figure 6:
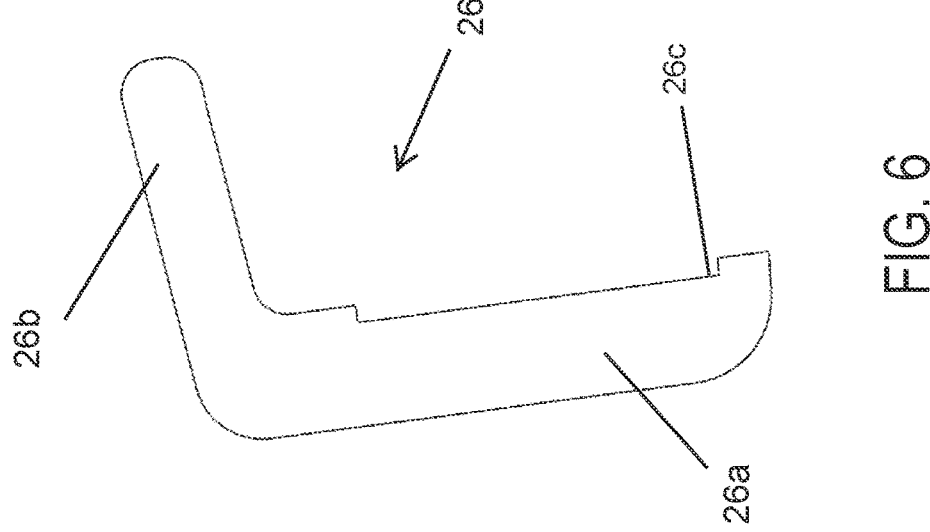
FIG. 6 is an end view of the lower guide element of FIGS. 4 and 5.
Figure 7:
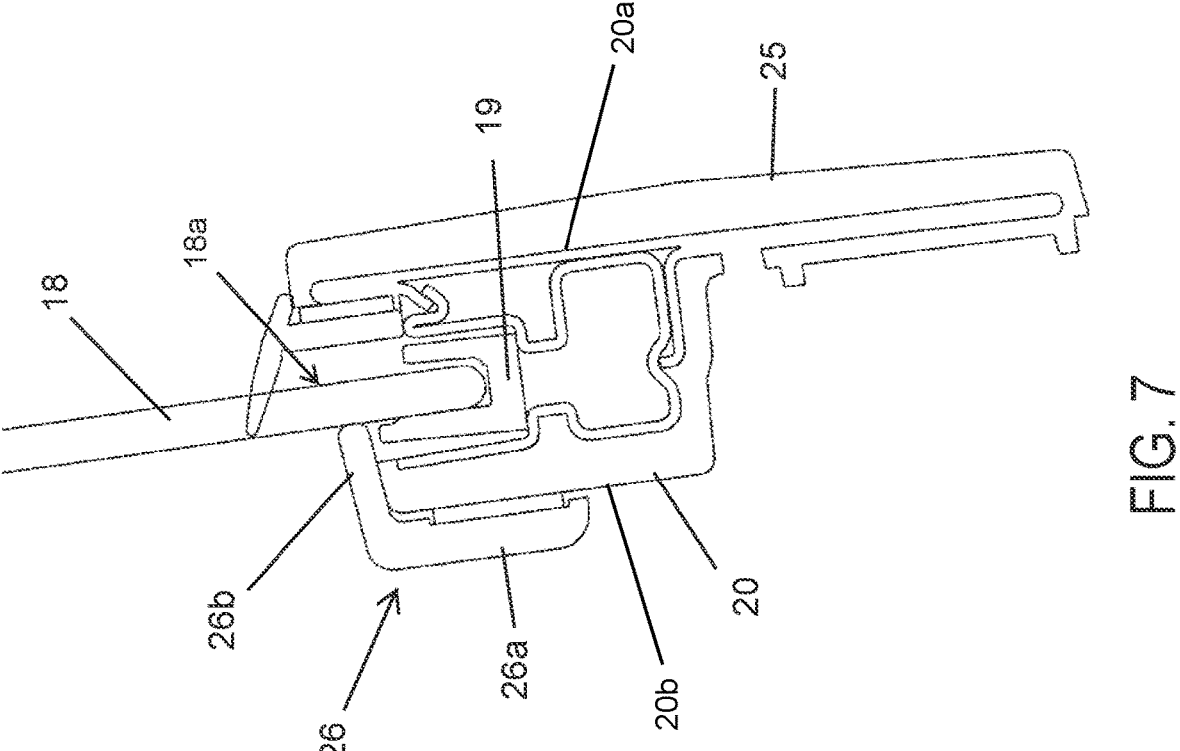
FIG. 7 is a sectional view of a lower portion of the rear slider window assembly, with the lower guide element of FIGS. 4-6 attached at the lower rail.
Figure 8:
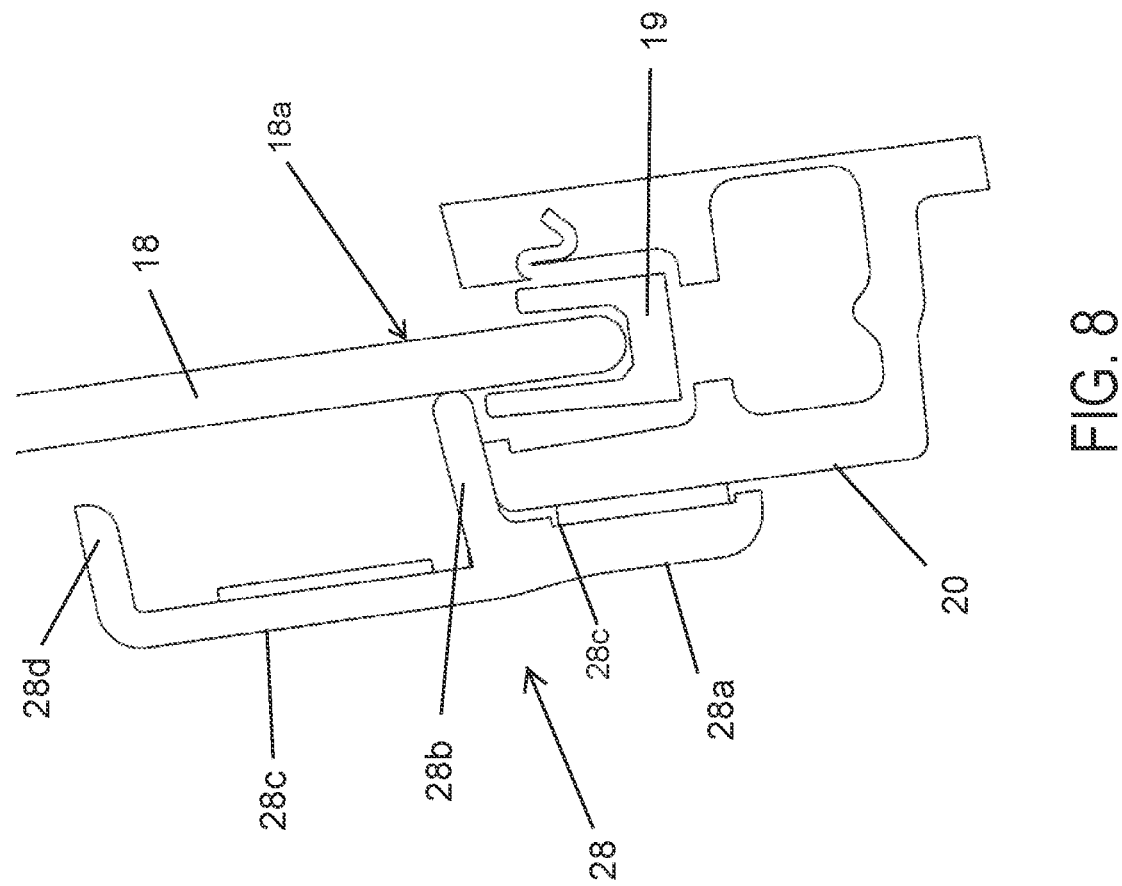
FIG. 8 is another sectional view of the lower portion of the rear slider window assembly, showing a lower guide element with a cable guide portion for guiding a flexible electrical connector for providing power to a heater grid of the movable window panel.

In the illustrated embodiment, the lower guide element or retaining element 24 comprises a first lower guide element or retaining element 26 and a second lower guide element or retaining element 28 disposed along the lower frame 20. However, it is envisioned that the lower guide element 24 may comprise a single unitary guide element having a first portion 26 and a second portion 28 formed as part of the single guide element 24. The guide element or elements may comprise extruded or molded plastic or polymeric elements. The first and second guide elements 26, 28 each have a respective attaching portion 26a, 28a that is configured for adhesive attachment to an outer portion of the lower frame 20 and a respective guide portion or retaining portion 26b, 28b that, with the respective attaching portions 26a, 28a attached at the lower frame 20, extends partially across the lower channel of the lower frame 20 in which the movable window panel 18 is disposed, so as to limit movement of the movable window panel 18 toward the outer part of the lower rail or upward out of the lower channel. Thus, with a first attaching surface 20a of the lower rail 20 attached along an inner surface of the fixed window panel 16 (and optionally along a lower trim panel), the respective guide portions 26b, 28b extend toward and optionally engage the inner surface of the movable window panel 18. As can be seen in FIGS. 6-8, each of the attaching portions 26a, 28a include a respective channel or recess 26c, 28c for receiving adhesive or tape for adhesively attaching the element 26, 28 to a second attaching surface 20b of the lower rail 20. As can also be seen with reference to FIGS. 7 and 8, the lower rail 20 is configured to attach to the trim panel 25 at the center region of the window assembly and to the fixed window panel (not shown in FIG. 8) at the side region of the window assembly.

Figure 2:
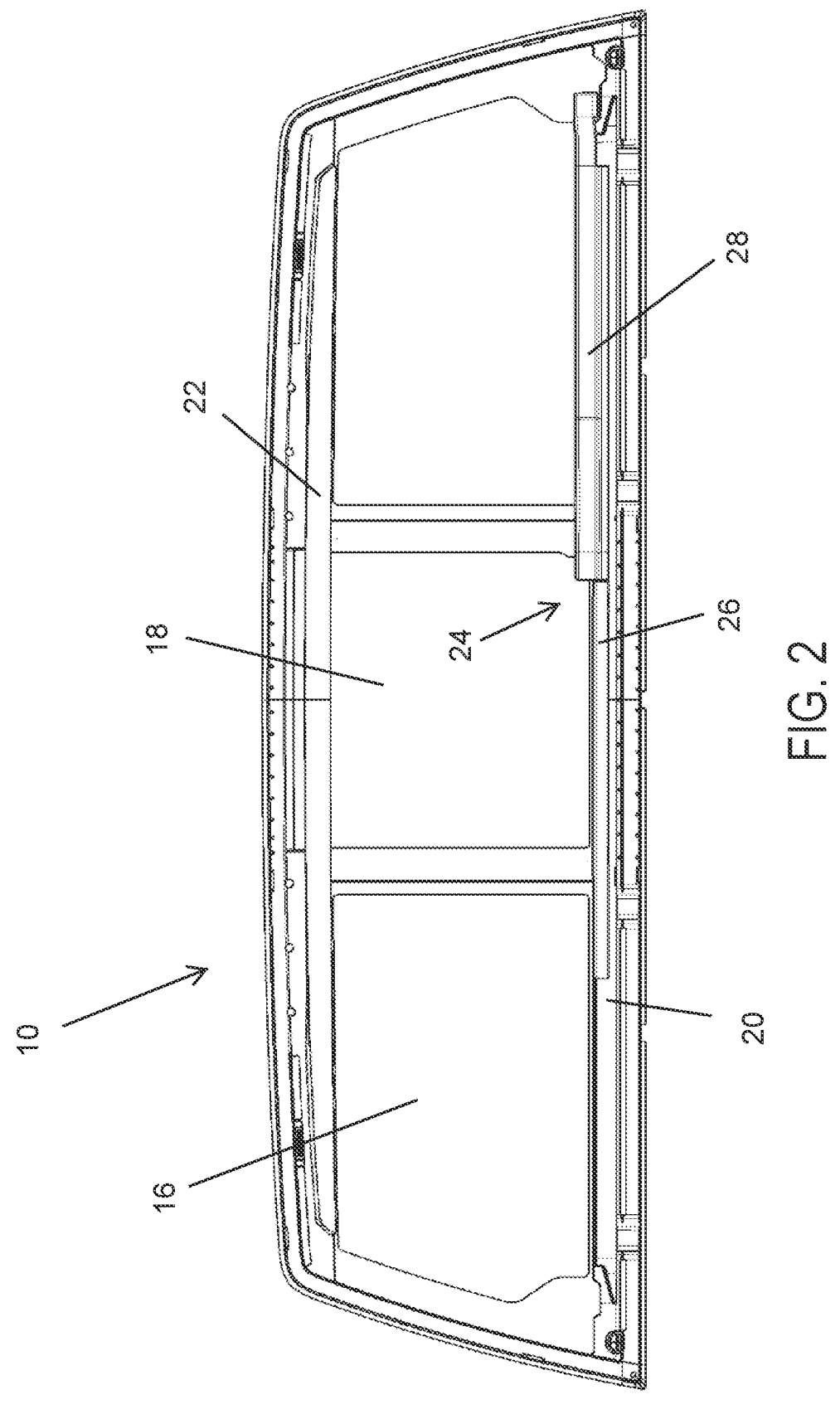
FIG. 2 is a plan view of the rear slider window assembly.
Figure 3:
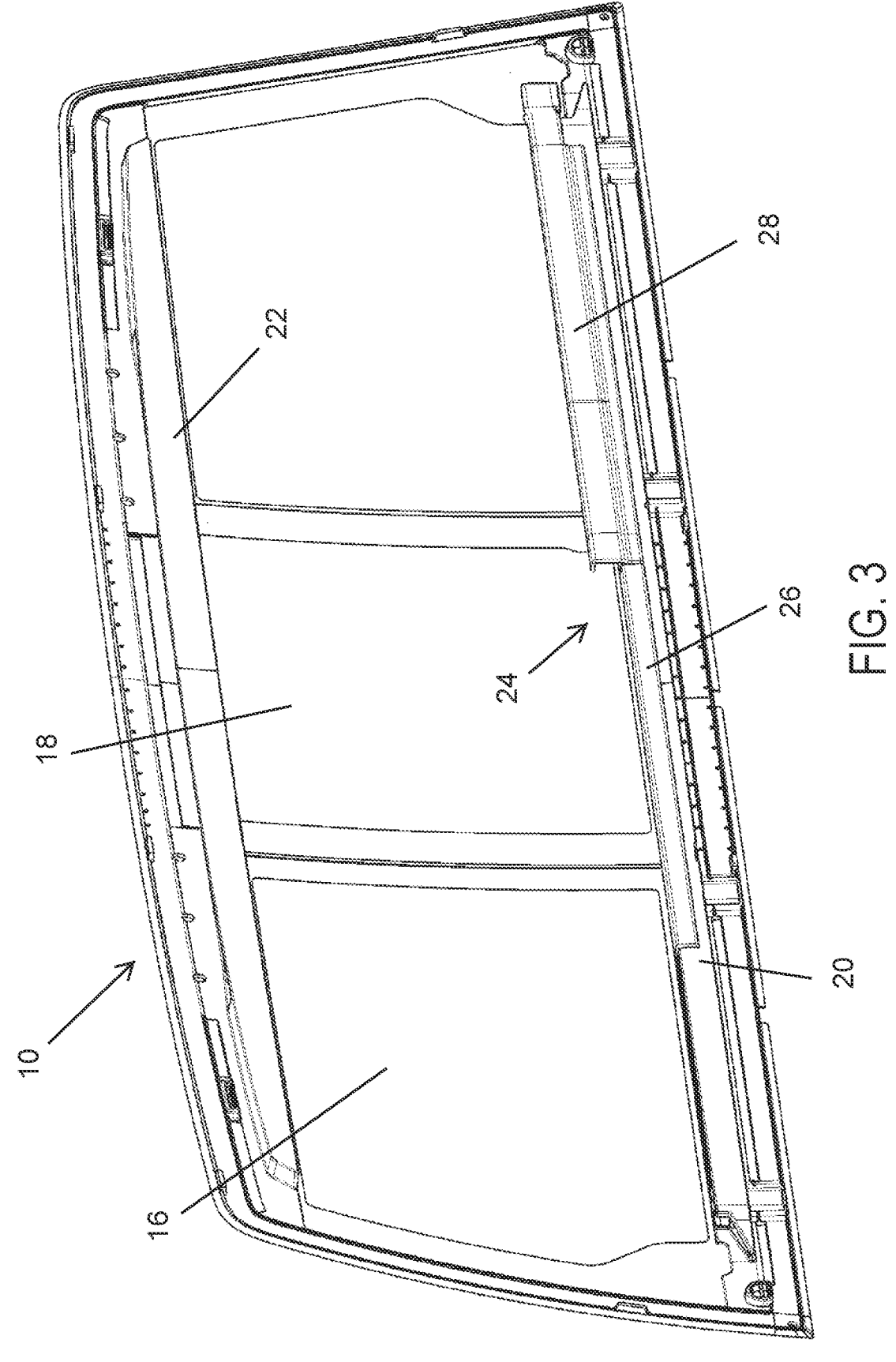
FIG. 3 is a perspective view of the rear slider window assembly, showing lower guide elements for retaining the movable window panel within the lower channel.
Figures 4, 5:
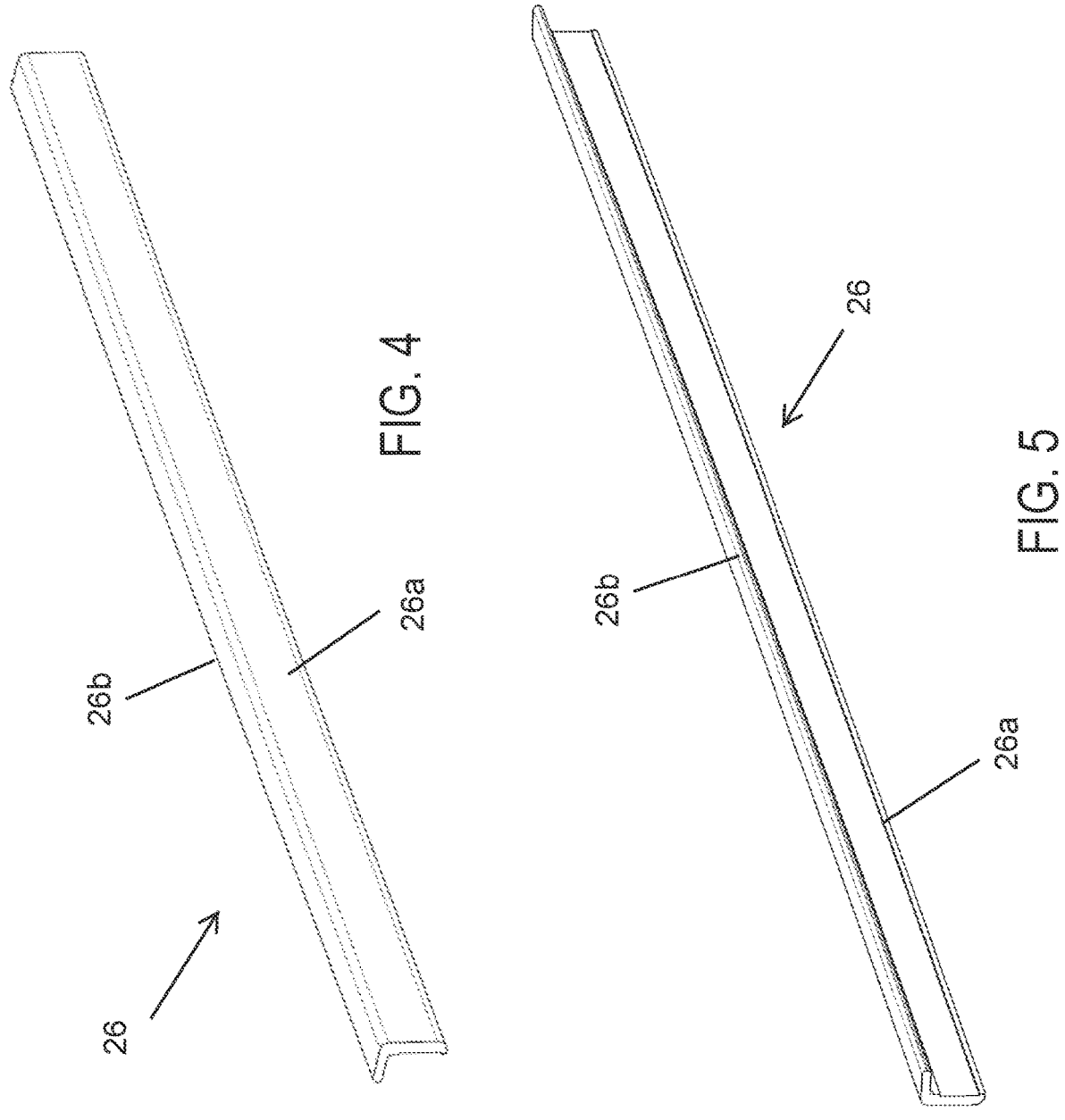
FIGS. 4 and 5 are perspective views of one of the lower guide elements.

As shown in FIGS. 2, 3, and 7, the first lower guide element 26 may be positioned along the lower rail 20 at a central region of the window assembly (i.e., the region corresponding to the aperture in the fixed window panel 16) so that, with the movable window panel in the closed position, the guide portion 26b of the first lower guide element 26 engages the movable window panel 18 at the lower perimeter edge region 18a above the lower rail 20 to limit or preclude movement of the movable window panel 18 away from the fixed window panel 16. The guide portion 26b extends over the channel of the lower rail 20 to limit or preclude movement of the carrier 19 (and therefore movable window panel) upward and outward of the lower rail 20.

The second lower guide element 28 may be positioned along the lower rail 20 and at least partially along the fixed window panel 16 at the side of the fixed window panel along which the movable window panel 18 moves when moving toward and into the opened position. The guide portion 28b of the second lower guide element 28, similar to the guide portion 26b of the first lower guide element 28, may extend over the channel of the lower rail 20 toward the movable window panel 18 to limit or preclude movement of the movable window panel away from the fixed window panel and upward and outward of the channel. The first lower guide element 26 and the second lower guide element 28 may overlap or be positioned directly adjacent one another, or comprise a unitary guide element, to provide a continuous guide portion 26b, 28b along a range of movement of the movable window panel 18 along the lower rail 20.

Figures 9, 10:
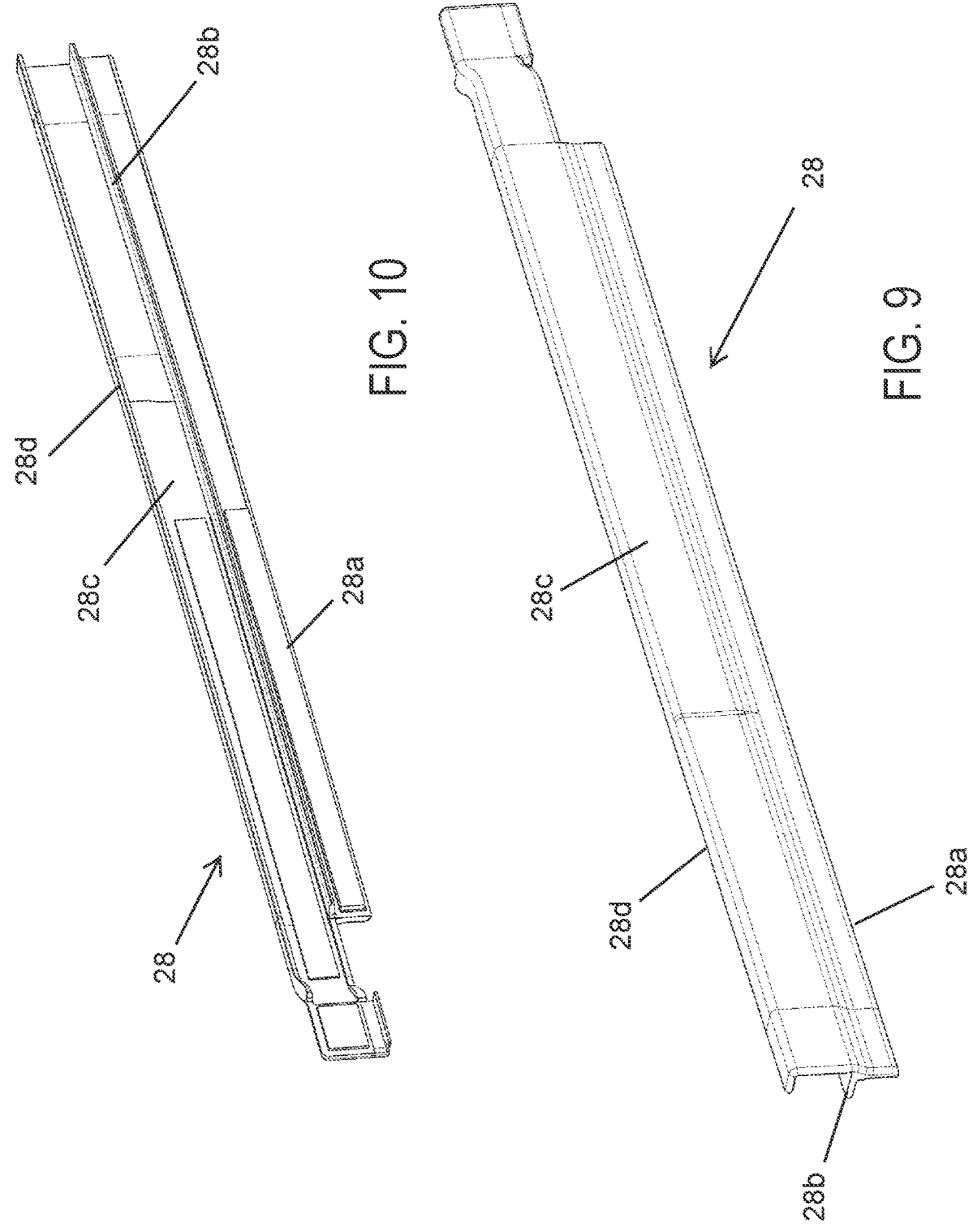
FIGS. 9 and 10 are perspective views of the lower guide element with the guide portion.

As shown in FIGS. 8-10, the lower guide element 28 includes an upper guide portion 28c that extends upward from the guide portion 28b, with an upper lip 28d at its upper end so as to form an upper channel. The upper channel formed by the guide portions 28b, 28c, and the upper lip 28d is disposed along the fixed window panel (and along the movable window panel when the movable window panel is opened) for receiving and guiding a flexible electrical connector or cable that provides electrical current to the heater grid of the movable window panel 18. The guide portions 28b, 28c, and the upper lip 28d and the flexible electrical connector or cable may utilize aspects of the window assemblies described in U.S. Pat. Nos. 8,881,458 and/or 8,402,695, which are hereby incorporated herein by reference in their entireties.

Thus, during assembly of the window, the upper edge 18b of the movable window panel 18 may be inserted upward into the channel of the upper rail 22 a sufficient amount to provide clearance of the lower edge 18a of the movable window panel 18 (which may have the guiding portion or seal or carrier element 19 disposed thereat) to be positioned above the lower channel of the lower rail 20, whereby the movable window panel 18 is lowered into the lower channel of the lower rail 20. When so positioned, the respective attaching portions 26a, 28a of the first and second guide elements 26, 28 are attached at the lower rail 20 and the respective guide portions 26b, 28b extend partially across the lower channel toward the inner surface of the movable window panel 18 (as best shown in FIGS. 7 and 8). With the movable window panel and carrier element 19 disposed in the lower channel of the lower rail 20 and the guide elements 26, 28 attached at the lower rail 20, the respective guide portions 26b, 28b may engage the inner surface of the movable window panel and provide a barrier preventing the carrier element 19 from moving upwards within the lower channel or pulling out of the lower channel. The guide portions 26b, 28b thus limit or preclude upward movement of the movable window panel and limit or preclude chucking of the movable window panel during opening and closing of the window. The attaching portions 26a, 28a and the guide portions 26b, 28b are similar for both the first and second lower guide elements 26, 28, with the second lower guide element 28 further including the upper guide portion 28c along the fixed window panel (at the side toward which the movable panel moves to open) for receiving and guiding the electrical connector of the heater grid.

Figure 11:
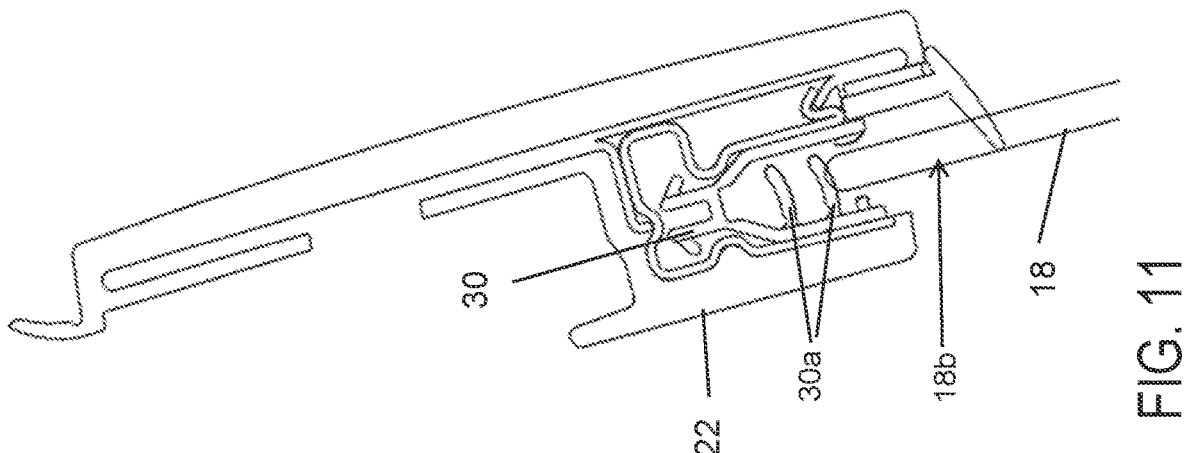
FIG. 11 is a sectional view of the upper portion of the rear slider window assembly, with an upper seal element disposed within the upper channel of the upper rail.
Figure 13:
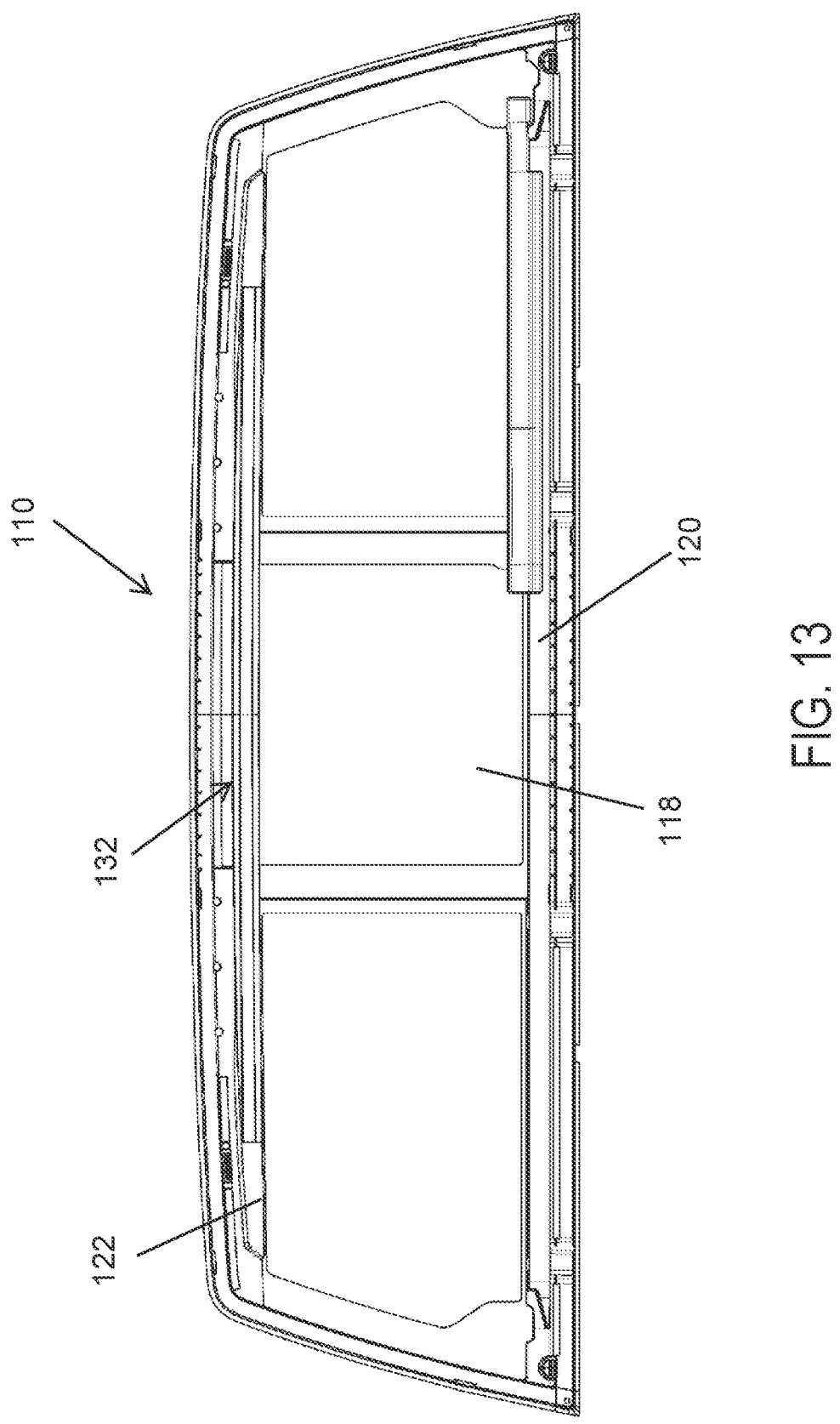
FIG. 13 is a plan view of another rear slider window assembly, with an upper guide element disposed along the upper rail.
Figure 14:
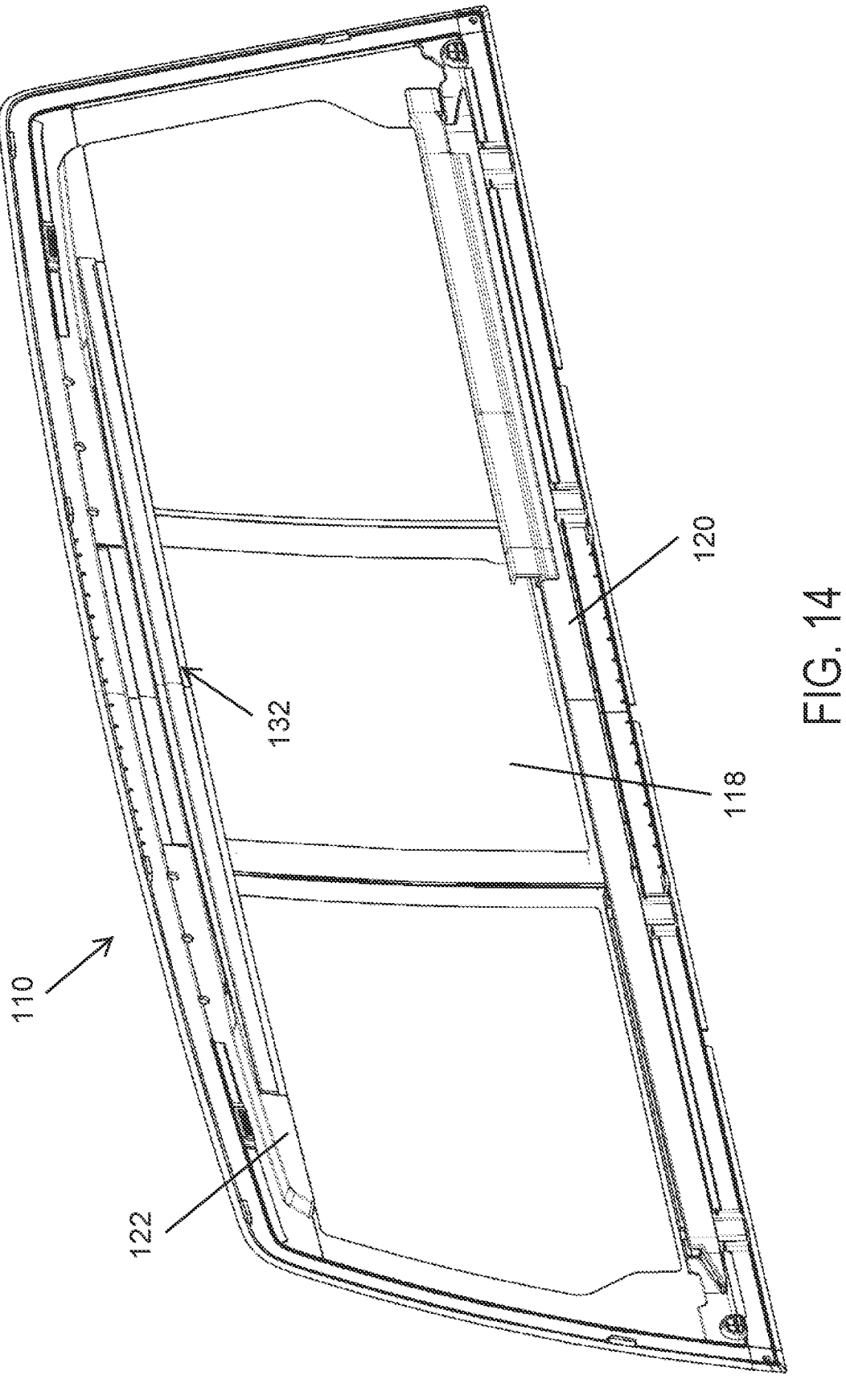
FIG. 14 is a perspective view of the rear slider window assembly of FIG. 13.

Optionally, the window assembly may include an upper seal 30 (FIG. 11) that allows for insertion of the upper perimeter edge 18b of the movable window panel 18 into the upper rail 22 a sufficient amount for the lower perimeter edge 18a to clear the lower rail 20 during the assembly process. For example, the upper rail 22 may receive an upper seal or filler 30 (FIG. 11) therein that is flexible/compressible to allow for the upper perimeter edge 18b of the movable window panel 18 to be inserted substantially into the upper rail 22. As shown, the upper seal 30 is disposed along the channel of the upper rail 22 and includes one or more flexible members or arms 30a that extend across the channel of the upper rail. The flexible arms 30a may flex (i.e., the biasing force may be overcome) when the movable window panel 18 is moved upward into the channel of the upper rail during installation of the movable window panel and may seal against the upper perimeter edge of the movable window panel 18 during sideways movement of the movable window panel (between the opened and closed positions). Engagement of the flexible arms 30a at the upper perimeter edge of the movable window panel 18 may further limit or preclude water and contaminants from getting around the window panel. The window assembly and upper seal may comprise aspects of the window assemblies and seals and fillers described in U.S. Publication No. US-2020-0079198 and/or U.S. patent application Ser. No. 17/457,265, filed Dec. 2, 2021 and published as U.S. Publication No. US-2022-0089008, which are hereby incorporated herein by reference in their entireties.

Figure 12:
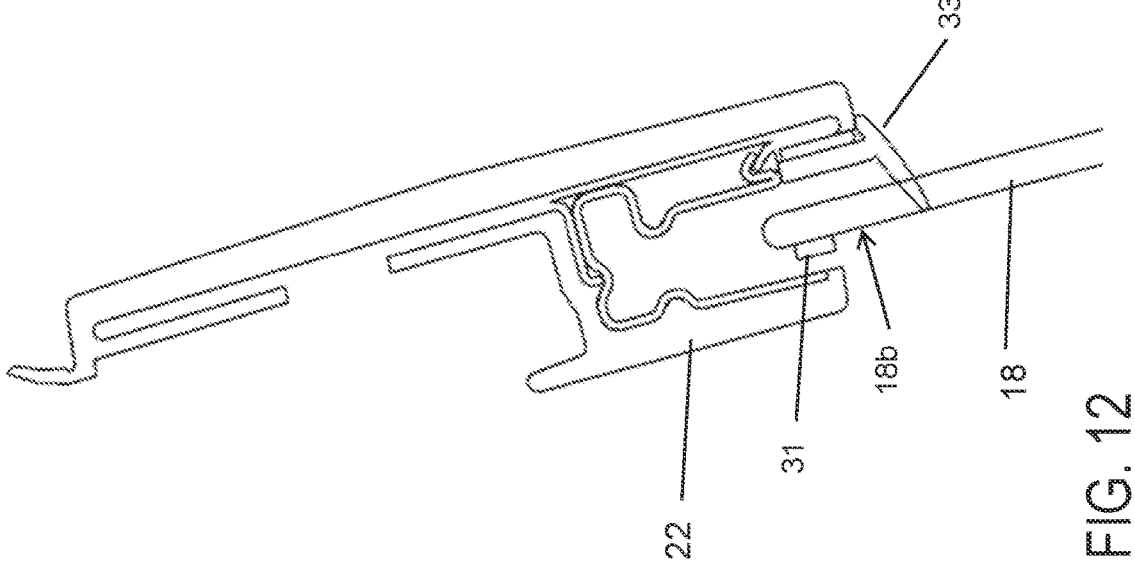
FIG. 12 is another sectional view of the upper portion of the rear slider window assembly, without an upper seal element disposed within the upper channel.

Optionally, and such as shown in FIG. 12, the upper rail 22 may not include the upper seal, whereby the upper perimeter edge 18b of the movable window panel 18 is guided within and along the upper rail via a seal 31 on the movable window panel 18 and a seal 33 of the upper rail that engages an outer surface of the window panel. For example, the seal 31 on the movable window panel 18 may be disposed on the inner surface of the panel at the upper perimeter edge region 18b of the movable window panel so that, with the movable window panel installed at the window assembly, the seal 31 is at least partially disposed in the channel of the upper rail 22.

Figure 19:
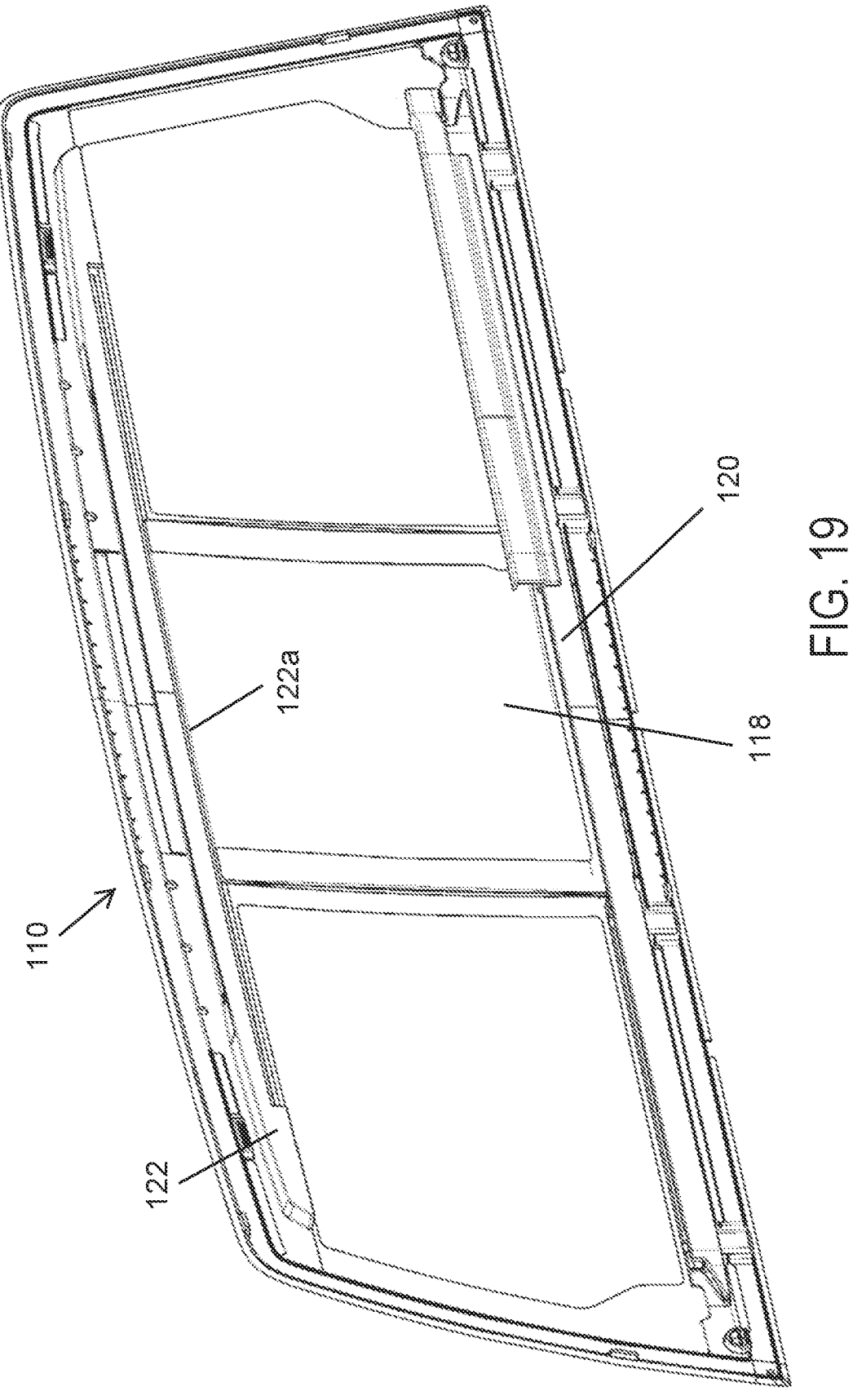
FIG. 19 is a perspective view of the rear slider window assembly of FIG. 14, with the upper guide element removed.
Figure 20:
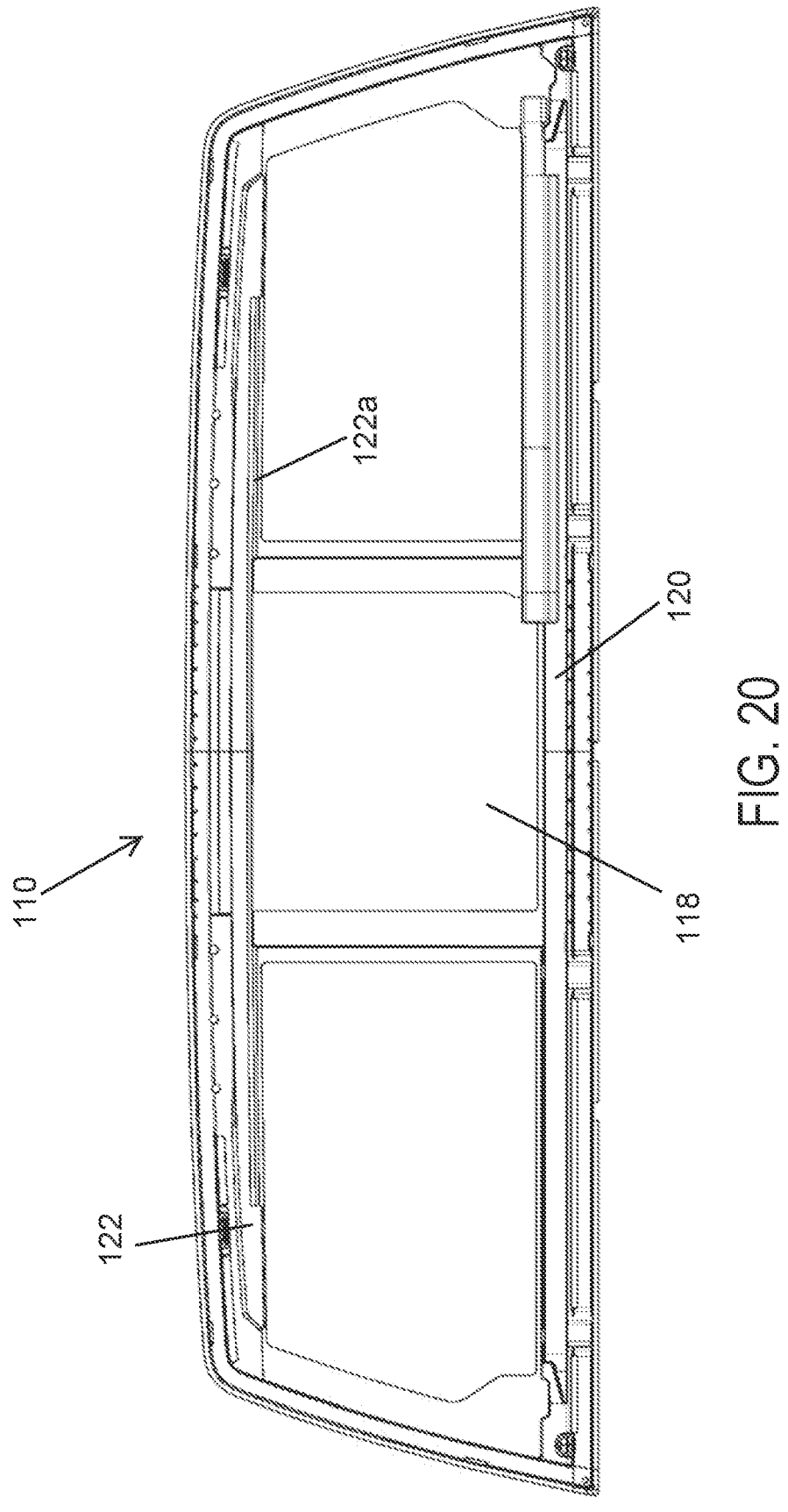
FIG. 20 is a plan view of the rear slider window assembly of FIG. 19.

Optionally, the rear slider window assembly may include an upper guide element or retaining element or anti-chucking element disposed at and along the upper guide rail. For example, and with reference to FIGS. 13-20, the rear slider window assembly 110 includes an upper guide element or retaining element 132 disposed along the upper rail 122. In the illustrated embodiment, the upper guide element 132 includes an attaching portion 132a and a guide portion or retaining portion 132b that, with the attaching portion 132a attached at an attaching surface 122a of the upper rail 122, extends at least partially across the upper channel of the upper rail 122 to limit or preclude upward movement of the movable window panel 118. The upper guide element 132 includes a lower lip 132c that extends downward from the guide portion 132b to limit outward movement of the movable window panel. As can be seen with reference to FIGS. 18-20, the upper rail 122 is cut away or notched (see notch or recess 122a in FIGS. 19 and 20) to receive the guide portion 132b therein, with the lower lip 132b effectively replacing the removed or cutaway wall of the upper rail.

Figures 15, 16:
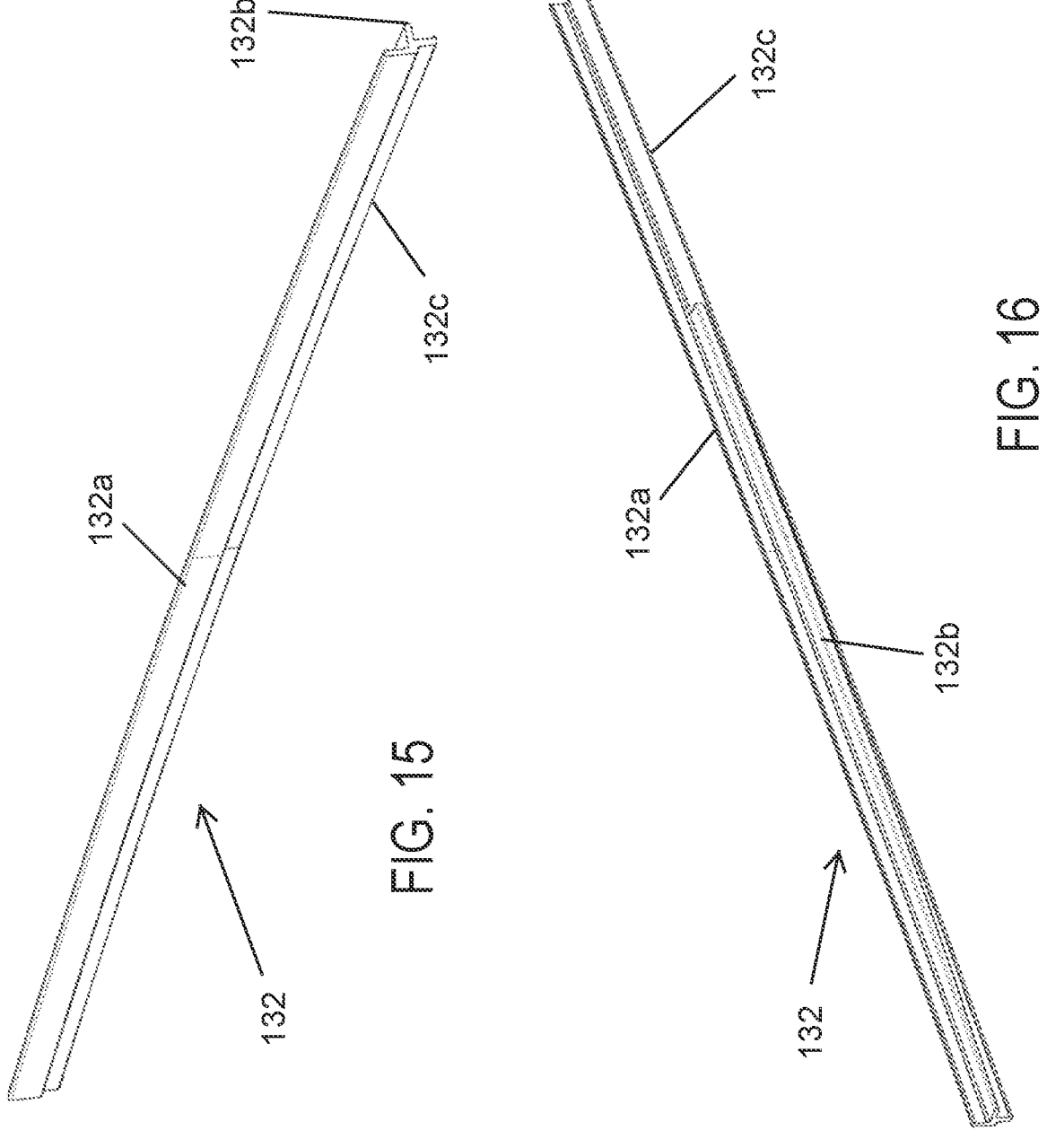
FIGS. 15 and 16 are perspective views of the upper guide element.
Figure 17:
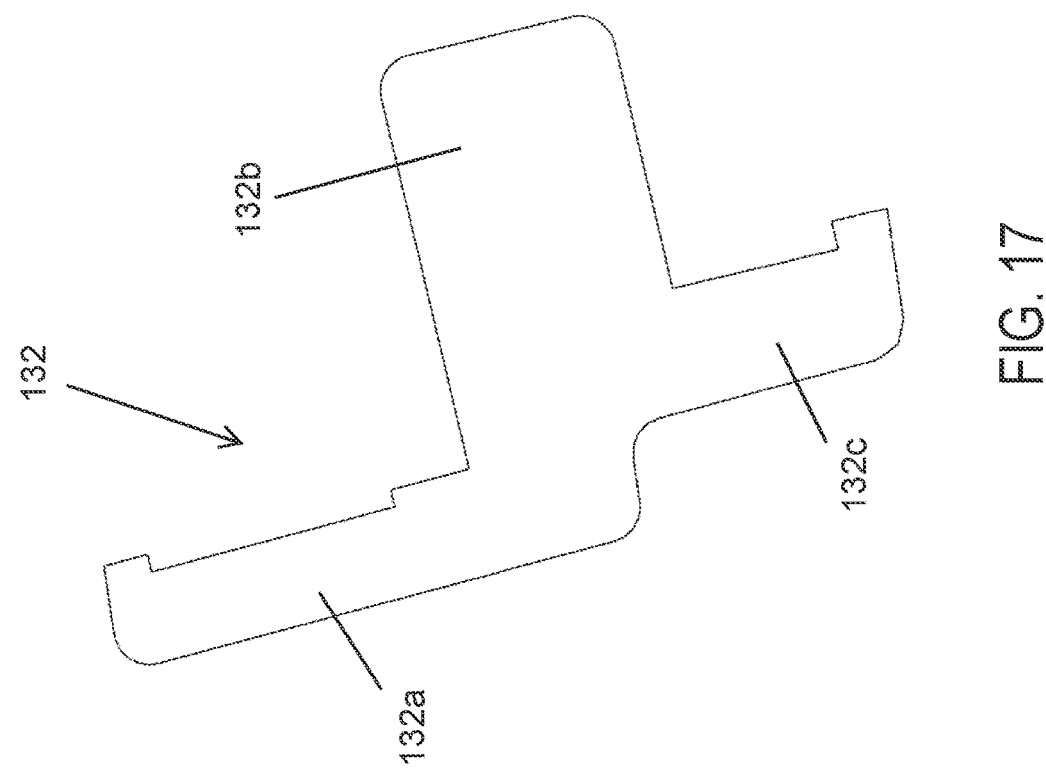
FIG. 17 is an end view of the upper guide element.

Thus, the movable window panel 118 can be inserted upward into the upper rail 122 a sufficient amount to allow clearance of the lower perimeter edge of the window panel at the lower rail 120, so as to position the lower perimeter edge within the lower channel of the lower rail 120. When the movable panel is lowered into the lower rail, the attaching portion 132a of the upper guide element 132 is attached (such as via adhesive or tape) at the upper rail above the cutout region 122a. When the attaching portion is attached at the upper rail, the guide portion 132b extends over the upper perimeter edge of the movable window panel 118, thereby limiting or precluding upward movement of the movable window panel so the movable window panel is retained within the upper and lower rails (see FIG. 18). As can be seen in FIG. 16, the guide portion 132b does not extend along the entire length of the guide element 132, since it is not needed along the rail at the fixed window panel at the side of the window assembly that the movable window panel does not move toward when opening.

Accordingly, the present invention provides a guide element that is attached to the upper or lower rail after the movable window panel is positioned within the channels. By attaching the guide element after the movable window panel is disposed in the channels, assembly of the window is enhanced and special guide elements and seals within the rails are not needed. The movable window panel is positioned in the lower rail and the lower guide element is attached at the lower rail to limit upward movement of the lower portion or carrier of the movable window panel, and/or the upper guide element is attached at the upper rail to limit upward movement of the upper portion of the movable window panel. The guide element or elements are bonded or taped or otherwise adhesively attached along the upper or lower rail and retain and guide the movable window panel as it moves along the upper and lower rails between its opened and closed positions.

The movable or slider window panel may be movable such as via manual pushing or pulling at the window panel and preferably is movable in response to actuation of a drive motor of the drive motor assembly or system, which may move cables or wires of cable assemblies relative to the sheath of the cable assemblies to impart horizontal movement of the carrier and slider window panel along the upper and lower rails. Optionally, the drive motor assembly and rail configurations may utilize aspects of the drive assemblies of the types described in U.S. Pat. Nos. 4,920,698; 4,995,195; 5,146,712; 5,531,046; 5,572,376; 6,955,009; 7,073,293 and/or 8,938,914, and/or U.S. Publication Nos. US-2019-0383084; 2008-0127563 and/or 2004-0020131, which are all hereby incorporated herein by reference in their entireties.

Optionally, the fixed window panel or panels may include an electrically conductive heater grid or other heating element or electrically operable element established at the window panel or panels (such as at or on an interior surface of the window panel) and the movable window panel may include an electrically conductive heater grid or other heating element or electrically operable element established at the movable window panel (such as at or on an interior surface of the movable window panel). Optionally, the heater grids may be laminated within the fixed window panel and/or the movable window panel, such as by utilizing aspects of the window assemblies described in U.S. Pat. No.

10,524,313, which is hereby incorporated herein by reference in its entirety. The heater grids are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels. The movable panel heater grid is electrically connected to the power source (and may be electrically connected to electrical terminals or elements at one of the heater grids of the fixed window panels) and may be electrically powered to heat or defrost or defog the movable window panel. The heater grids comprise a plurality of electrically conductive traces that extend across the respective window panels between respective busbars to provide enhanced and more uniform heating and defrosting/defogging of the window panel. The heater grid of the movable window panel may be powered in a manner that allows for heating or defogging or defrosting of the movable window panel irrespective of whether the movable window panel is opened or partially opened or closed. For example, the electrical connections may be made via a flexible electrical connector or wire or cable or the like, such as by utilizing aspects of the rear slider window assemblies described in U.S. Pat. Nos. 8,881,458 and/or 8,402,695, which are hereby incorporated herein by reference in their entireties. Optionally, the heater grid of the movable window panel may be powered only when in its closed position and/or via any suitable powering means.

Optionally, the window assembly or assemblies of the present invention may utilize aspects of the window assemblies described in U.S. Pat. Nos. 10,668,868; 10,501,008; 9,896,026; 8,915,018; 8,881,458; 8,402,695; 7,073,293; 7,003,916; 6,119,401; 6,026,611; 5,996,284; 5,799,444 and/or 6,691,464, and/or U.S. Publication Nos. 2014-0047772; 2008-0127563; 2006-0107600; 2004-0020131 and/or 2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A method for manufacturing a vehicular rear slider window assembly, the method comprising:

providing a fixed window panel comprising an inner side and an outer side and defining an opening;

attaching an upper rail and a lower rail at the inner side of the fixed window panel;

wherein the lower rail comprises a U-shaped rail having a channel with (i) a first leg along one side of the channel and having a first attaching surface that attaches at the inner side of the fixed window panel and (ii) a second leg along the other side of the channel and spaced from the first leg and having a second attaching surface that is opposite from the first attaching surface and separated from the first attaching surface by a thickness of the lower rail;

disposing a movable window panel in the channel of the lower rail and a channel of the upper rail, the movable window panel comprising (i) a lower perimeter edge received in the channel of the lower rail and (ii) an upper perimeter edge received in the channel of the upper rail;

wherein the movable window panel, when disposed in the channel of the lower rail and the channel of the upper rail, is movable along the upper rail and the lower rail between a closed position, where the movable window panel is positioned at the opening of the fixed window panel, and an opened position, where the movable window panel is moved at least partially away from the opening;

after the movable window panel is disposed in the channels of the upper and lower rails, attaching a retaining element along the lower rail and at the second attaching surface of the lower rail;

wherein the retaining element includes an attaching portion that attaches at the second attaching surface of the lower rail and a retaining portion that, with the retaining element attached along the lower rail, extends from the attaching portion and at least partially across the channel of the lower rail between the attaching portion and an inner side of the movable window panel to limit vertical movement of the movable window panel relative to the upper and lower rails; and wherein the movable window panel has a carrier element disposed along a lower perimeter region of the movable window panel, and wherein disposing the movable window panel in the channel of the lower rail comprises movably disposing the carrier element in the channel of the lower rail, and wherein the retaining portion of the retaining element limits upward movement of the carrier element relative to the lower rail to limit dislodging of the movable window panel from the lower rail.

2. The method of claim 1, wherein, with the retaining element attached along the lower rail, the retaining portion extends at least partially across the channel of the lower rail between the attaching portion and an inner side of the movable window panel.

3. The method of claim 1, wherein the fixed window panel comprises a single fixed window panel having the opening, and wherein the upper rail attaches above the opening and the lower rail attaches below the opening.

4. The method of claim 1, wherein the fixed window panel comprises a pair of spaced apart fixed window panels, and wherein an upper trim panel is disposed between the pair of spaced apart fixed window panels above the opening and a lower trim panel is disposed between the pair of spaced apart fixed window panels below the opening, and wherein the upper rail attaches at an inner side of the upper trim panel and the lower rail attaches at an inner side of the lower trim panel.

5. The method of claim 1, wherein the vehicular rear slider window assembly is configured to be disposed at a rear portion of a cabin of a pickup truck.

6. The method of claim 1, wherein the vehicular rear slider window assembly is configured to be disposed at a rear portion of a cabin of a vehicle, and wherein, with the vehicular rear slider window assembly disposed at the rear portion of the cabin of the vehicle, the inner side of the fixed window panel is toward the cabin of the vehicle and the outer side of the fixed window panel is exterior of the vehicle.

7. A method for manufacturing a vehicular rear slider window assembly, the method comprising:

providing a fixed window panel comprising an inner side and an outer side and defining an opening;

attaching an upper rail and a lower rail at the inner side of the fixed window panel;

wherein the lower rail comprises (i) a first attaching surface that attaches at the inner side of the fixed window panel and (ii) a second attaching surface that is opposite from the first attaching surface;

disposing a movable window panel in a channel of the lower rail and a channel of the upper rail, the movable window panel comprising (i) a lower perimeter edge received in the channel of the lower rail and (ii) an upper perimeter edge received in the channel of the upper rail;

wherein the movable window panel, when disposed in the channel of the lower rail and the channel of the upper rail, is movable along the upper rail and the lower rail between a closed position, where the movable window panel is positioned at the opening of the fixed window panel, and an opened position, where the movable window panel is moved at least partially away from the opening;

after the movable window panel is disposed in the channels of the upper and lower rails, attaching a retaining element along the lower rail and at the second attaching surface of the lower rail;

wherein the retaining element includes an attaching portion that attaches at the second attaching surface of the lower rail and a retaining portion that, with the retaining element attached along the lower rail, extends at least partially across the channel of the lower rail to limit vertical movement of the movable window panel relative to the upper and lower rails; and after the movable window panel is disposed in the channels of the upper and lower rails, attaching an upper retaining element along the upper rail, wherein the upper retaining element includes an upper attaching portion that attaches at an attaching surface of the upper rail and an upper retaining portion that, with the upper retaining element attached along the upper rail, extends at least partially across the channel of the upper rail so as to be positioned above an upper edge of the movable window panel to limit vertical movement of the movable window panel relative to the upper rail.

8. The method of claim 7, wherein the upper retaining element attaches at a notched region of the upper rail.

9. The method of claim 7, wherein the lower rail comprises a U-shaped rail that comprises the channel, and wherein the U-shaped rail has (i) a first leg along one side of the channel and (ii) a second leg along the other side of the channel and spaced from the first leg.

10. The method of claim 9, wherein the first leg comprises the first attaching surface, and wherein the second leg comprises the second attaching surface.

11. The method of claim 10, wherein the first attaching surface is separated from the second attaching surface by a thickness of the lower rail.

12. A method for manufacturing a vehicular rear slider window assembly, the method comprising:

providing a fixed window panel comprising an inner side and an outer side and defining an opening;

attaching an upper rail and a lower rail at the inner side of the fixed window panel;

wherein the lower rail comprises a U-shaped rail having a channel with (i) a first leg along one side of the channel and having a first attaching surface that attaches at the inner side of the fixed window panel and (ii) a second leg along the other side of the channel and spaced from the first leg and having a second attaching surface that is opposite from the first attaching surface and separated from the first attaching surface by a thickness of the lower rail;

disposing a movable window panel in the channel of the lower rail and a channel of the upper rail, the movable window panel comprising (i) a lower perimeter edge received in the channel of the lower rail and (ii) an upper perimeter edge received in the channel of the upper rail;

wherein the movable window panel, when disposed in the channel of the lower rail and the channel of the upper rail, is movable along the upper rail and the lower rail between a closed position, where the movable window panel is positioned at the opening of the fixed window panel, and an opened position, where the movable window panel is moved at least partially away from the opening;

after the movable window panel is disposed in the channels of the upper and lower rails, attaching a retaining element along the lower rail and at the second attaching surface of the lower rail;

wherein the retaining element includes an attaching portion that attaches at the second attaching surface of the lower rail and a retaining portion that, with the retaining element attached along the lower rail, extends from the attaching portion and at least partially across the channel of the lower rail between the attaching portion and an inner side of the movable window panel to limit vertical movement of the movable window panel relative to the upper and lower rails; and disposing a flexible seal in the channel of the upper rail, wherein the flexible seal, when the upper perimeter edge of the movable window panel is disposed in the channel of the upper rail, flexes to allow the movable window panel to be inserted further into the channel of the upper rail.

13. A method for manufacturing a vehicular rear slider window assembly, the method comprising:

providing a fixed window panel comprising an inner side and an outer side and defining an opening;

wherein the vehicular rear slider window assembly is configured to be disposed at a rear portion of a cabin of a vehicle, and wherein, with the vehicular rear slider window assembly disposed at the rear portion of the cabin of the vehicle, the inner side of the fixed window panel is toward the cabin of the vehicle and the outer side of the fixed window panel is exterior of the vehicle;

attaching an upper rail and a lower rail at the inner side of the fixed window panel;

wherein the lower rail comprises a U-shaped rail having a channel with (i) a first leg along one side of the channel and having a first attaching surface that attaches at the inner side of the fixed window panel and (ii) a second leg along the other side of the channel and spaced from the first leg and having a second attaching surface that is opposite from the first attaching surface and separated from the first attaching surface by a thickness of the lower rail;

disposing a movable window panel in a channel of the lower rail and a channel of the upper rail, the movable window panel comprising (i) a lower perimeter edge received in the channel of the lower rail and (ii) an upper perimeter edge received in the channel of the upper rail;

wherein the movable window panel, when disposed in the channel of the lower rail and the channel of the upper rail, is movable along the upper rail and the lower rail between a closed position, where the movable window panel is positioned at the opening of the fixed window panel, and an opened position, where the movable window panel is moved at least partially away from the opening;

after the movable window panel is disposed in the channels of the upper and lower rails, attaching a retaining element along the lower rail and at the second attaching surface of the lower rail;

wherein the retaining element includes an attaching portion that attaches at the second attaching surface of the lower rail and a retaining portion that, with the retaining element attached along the lower rail, extends from the attaching portion and at least partially across the channel of the lower rail between the attaching portion and an inner side of the movable window panel to limit vertical movement of the movable window panel relative to the upper and lower rails; and after the movable window panel is disposed in the channels of the upper and lower rails, attaching an upper retaining element along the upper rail, wherein the upper retaining element includes an upper attaching portion that attaches at an attaching surface of the upper rail and an upper retaining portion that, with the upper retaining element attached along the upper rail, extends at least partially across the channel of the upper rail so as to be positioned above an upper edge of the movable window panel to limit vertical movement of the movable window panel relative to the upper rail.

14. The method of claim 13, wherein the movable window panel has a carrier element disposed along a lower perimeter region of the movable window panel, and wherein disposing the movable window panel in the channel of the lower rail comprises movably disposing the carrier element in the channel of the lower rail, and wherein the retaining portion of the retaining element limits upward movement of the carrier element relative to the lower rail to limit dislodging of the movable window panel from the lower rail.

15. The method of claim 13, wherein the upper retaining element attaches at a notched region of the upper rail.

16. The method of claim 13, further comprising disposing a flexible seal in the channel of the upper rail, wherein the flexible seal, when the upper perimeter edge of the movable window panel is disposed in the channel of the upper rail, flexes to allow the movable window panel to be inserted further into the channel of the upper rail.

17. The method of claim 13, wherein the fixed window panel comprises a single fixed window panel having the opening, and wherein the upper rail attaches above the opening and the lower rail attaches below the opening.

18. The method of claim 13, wherein the fixed window panel comprises a pair of spaced apart fixed window panels, and wherein an upper trim panel is disposed between the pair of spaced apart fixed window panels above the opening and a lower trim panel is disposed between the pair of spaced apart fixed window panels below the opening, and wherein the upper rail attaches at an inner side of the upper trim panel and the lower rail attaches at an inner side of the lower trim panel.

19. The method of claim 13, wherein the vehicle comprises a pickup truck.

* * * * *